United States Patent [19]

Weisz

[11] Patent Number: 4,583,419
[45] Date of Patent: Apr. 22, 1986

[54] TORQUE TRANSMITTING HANDWHEEL CLIP-ON MEMBER FOR A SEWING MACHINE

[75] Inventor: William Weisz, Tenafly, N.J.

[73] Assignee: The Singer Company, Stamford, Conn.

[21] Appl. No.: 669,714

[22] Filed: Nov. 9, 1984

[51] Int. Cl.[4] .............................................. B62D 1/04
[52] U.S. Cl. ...................................... 74/552; 474/903; 403/362; 112/283
[58] Field of Search ................. 74/552, 548; 474/903; 403/362, 379; 112/220, 283

[56] References Cited

U.S. PATENT DOCUMENTS

| | | | |
|---|---|---|---|
| 140,982 | 7/1873 | Williams | 112/283 X |
| 195,436 | 9/1877 | Baker | 112/283 |
| 2,876,515 | 3/1959 | Saffer | 74/548 X |
| 2,968,969 | 1/1961 | Henning | 74/552 |
| 3,224,398 | 12/1965 | Greulich | 112/220 |
| 3,225,624 | 12/1965 | Creter | 74/573 |
| 3,395,661 | 8/1968 | Creter | 112/220 |
| 3,769,853 | 11/1973 | Schluckebier | 74/548 X |
| 3,953,140 | 4/1976 | Carlstrom | 403/362 X |
| 4,016,770 | 4/1977 | Enters | 474/903 |
| 4,175,881 | 11/1979 | Loos | 403/362 X |
| 4,276,787 | 7/1981 | Kellner | 74/552 |
| 4,453,624 | 6/1984 | Graham | 192/67 R |

Primary Examiner—Kenneth J. Dorner
Assistant Examiner—Shirish Desai
Attorney, Agent, or Firm—William V. Ebs; Robert E. Smith; Edward L. Bell

[57] ABSTRACT

A handwheel is assembled to a sewing machine arm shaft with a conical screw in association with a torque transmitting handwheel clip-on member having wings thereon which are disposed in line contact with the screw, and which include planar surfaces that are caused to engage planar surfaces on radially extending ribs of the handwheel.

5 Claims, 3 Drawing Figures

TORQUE TRANSMITTING HANDWHEEL CLIP-ON MEMBER FOR A SEWING MACHINE

BACKGROUND OF THE INVENTION

1. Field of the Invention

The invention is directed to a load distributing member for transmitting torque between the handwheel and arm shaft of a sewing machine.

2. Description of the Prior Art

It is known to connect the steel arm shaft of a sewing machine to a handwheel with a screw, and this is entirely satisfactory when the handwheel is also of steel. However, handwheels are now commonly molded plastic parts, and as such, exhibit deformation under the localized force exerted by the screw during rotation of the shaft by the handwheel, the result of which is ultimate damage to the handwheel and/or a sloppy connection between the handwheel and shaft.

It is a prime object of the present invention to provide a plastic handwheel and steel arm shaft of a sewing machine with an improved driving connection effective to prevent damage to the handwheel during rotation of the shaft by the handwheel.

It is another object of the invention to provide a plastic handwheel and steel arm shaft of a sewing machine with an improved driving connection effective to distribute the driving force therebetween over a large area of the handwheel, and so prevent damage thereto during rotation of the shaft by the handwheel.

Other objects and advantages of the invention will become apparent during a reading of the specification taken in connection with the accompanying drawings.

SUMMARY OF THE INVENTION

A plastic sewing machine handwheel according to the arrangement of the invention includes a central hollowed boss with a longitudinally extending slot, and ribs with planar sides extending radially from the boss. A steel arm shaft extends into the boss of the handwheel, and a screw affixed to the shaft extends radially therefrom to pass through said slot in the boss into a space between adjacent ribs of the handwheel. A member mounted between such adjacent ribs includes spaced apart wings with planar sides for engagement with the planar sides of said adjacent ribs. Each wing is located between one of the said adjacent ribs and the screw to transmit driving torque therebetween.

DESCRIPTION OF THE PREFERRED EMBODIMENT

Figure 1:
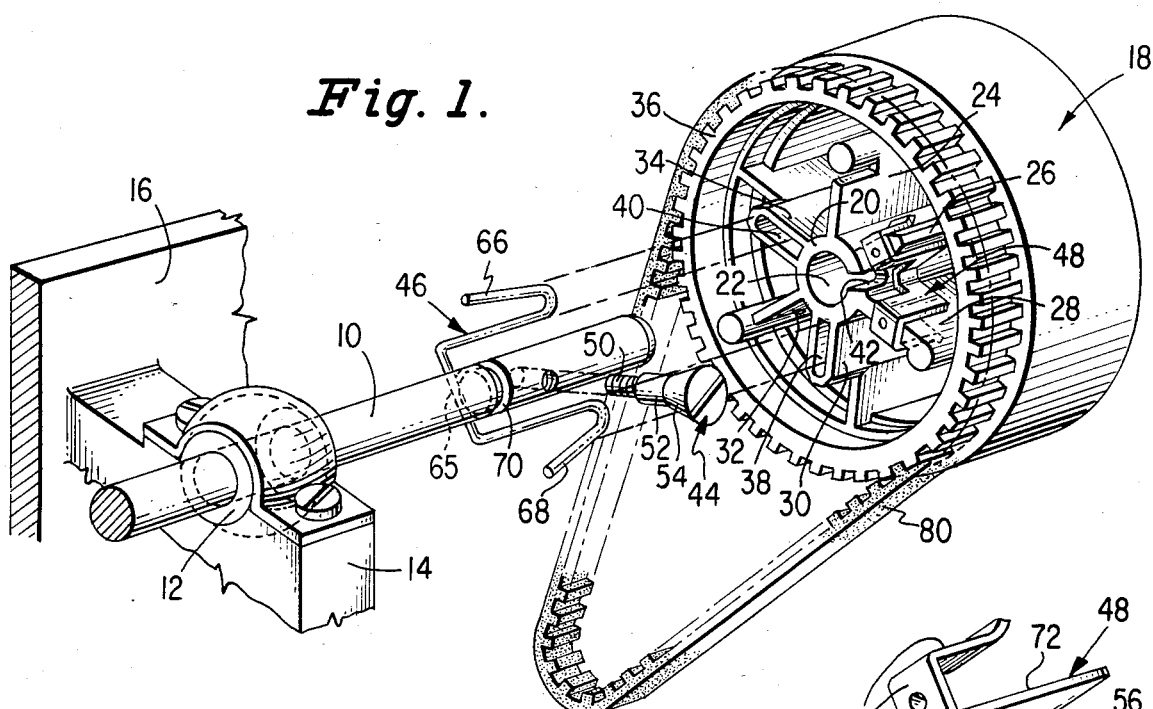
FIG. 1 is a perspective partially exploded view showing the arrangement of the invention for connecting a handwheel to a sewing machine arm shaft.
Figure 3:
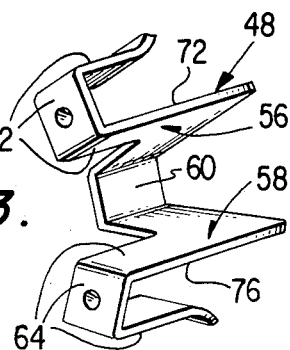
FIG. 3 is an enlarged perspective view of a torque transmitting member according to the invention.
Figure 2:
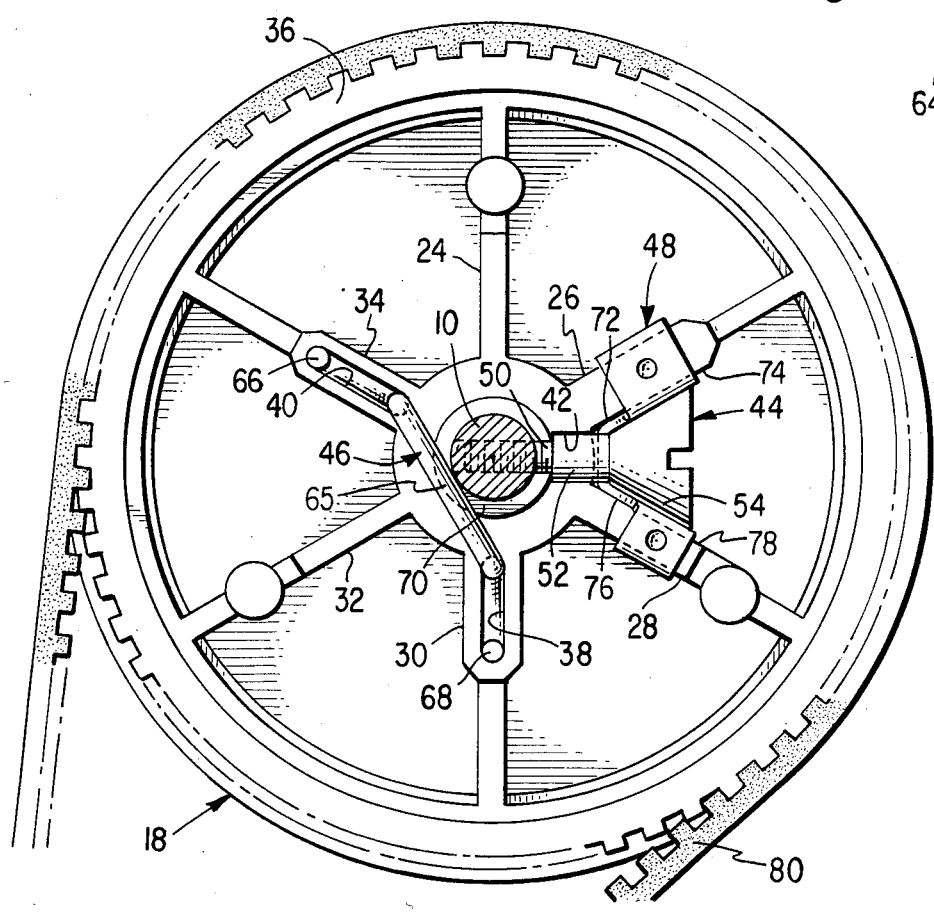
FIG. 2 is an enlarged end view of the handwheel taken transversely through the arm shaft having the handwheel secured thereon.

Referring to the drawings, reference character 10 designates a sewing machine arm shaft such as would normally be mounted for rotation on bearings, as for example, the bearing 12 shown affixed on a support 14 extending transversely from the back wall 16 of a sewing machine housing. Such arm shaft serves to drive various components (not shown) of the machine controlling the movement of stitch forming instrumentalities. The arm shaft may be understood as being a steel member to which a plastic handwheel 18 is secured in accordance with the invention.

Handwheel 18 includes a central hub 20 which is hallowed to provide an opening 22 wherein an end portion of shaft 10 is received. A plurality of ribs 24, 26, 28, 30, 32 and 34 extend radially outward from hub 20 to connect with the rim 36 of the handwheel. Two such ribs 30 and 34 include slots 38 and 40 respectively as shown. The hub includes a longitudinally extending slot 42 between adjacent ribs 26 and 28.

The handwheel is secured to arm shaft 10 with a screw 44, spring 46, and handwheel clip-on member 48. Screw 44 is formed with a threaded end portion 50, a cylindrical shank portion 52 and a conical head 54. Clip-on member 48 is a resilient sheet steel part with planar wings 56 and 58 which project outwardly from a bridging portion 60 therebetween. The wings 56 and 58 extend into and are part of U-shaped portions 62 and 64, respectively, formed on member 48. Spring 46 is a U-shaped wire member with a shaft engageable mid-portion 65, and with hooked end portions 66 and 68 that are angularly disposed to enter rib slots 40 and 38, respectively.

Initial steps in assembling the handwheel to the arm shaft include fastening screw 44 at threaded end 50 to the shaft, and attaching member 48 to the handwheel by clipping U-shaped portions 62 and 64 of the member onto ribs 26 and 28 respectively, located on opposite sides of hub slot 42. The handwheel and shaft are then oriented to align screw portion 52 with hub slot 42. The handwheel is slid onto the shaft as the shaft end is caused to enter opening 22, and the cylindrical shank portion 52 of the screw is caused to move into slot 42. Screw 44 is tightened so as to enforce line contact between the conical head 54 of the screw and the wings 56 and 58 of member 48. Finally, spring 46 is added to the assembly by disposing hooked ends 66 and 68 in rib slots 40 and 38, and mid-portion 65 in an annular recess 70 provided in shaft 10. Spring 44 serves to prevent axial movement of the handwheel on the shaft.

In the assembled position of handwheel 18 on shaft 10, a planar side 72 of wing 56 bears against a planar side 74 of rib 26, and a planar side 76 of wing 58 bears against a planar side 78 of rib 28. When the handwheel is rotated, as by a motor driven timing belt 80, one or the other of ribs 26 and 28, depending upon the direction of rotation of the handwheel, is caused to transmit a driving torque to the engaged wing of member 48, and such engaged wing is caused to transmit the torque to screw 44 which then rotates shaft 10. Since there is only planar surface contact between the handwheel ribs and wings of member 48, and no direct contact between the ribs and screw 44, there is no concentrated application of force against the plastic material of the handwheel such as would otherwise locally distort and damage the structure of the handwheel. While there is a concentrated application of the driving force along the line of contact between the conical head 54 of screw 44 and a metal wing of member 48, this force is evenly distributed to the rib by the wing and has no deleterious effect on the plastic material of the handhweel.

It is to be understood that the present disclosure relates to a preferred embodiment of the invention which is for purposes of illustration only and is not to be construed as limiting the invention. Numerous alterations and modifications of the structure herein will suggest themselves to those skilled in the art, and all such modifications and alterations which do not depart from the spirit and scope of the invention are intended to be included within the scope of the appended claims.

I claim:

1. In a sewing machine, a plastic handwheel including a central hollowed boss with a longitudinally extending slot, the handwheel also including ribs extending radially from the boss and having planar sides; a steel arm shaft extending into the boss; a screw affixed to the shaft, the screw extending radially therefrom and through said slot in the boss into a space between adjacent ribs of the handwheel; and a member mounted between the said adjacent ribs, the member including spaced apart wings with planar sides for engagement with the planar sides of said adjacent ribs, each wing being located between one of the said adjacent ribs and the screw to transmit driving torque therebetween.

2. The combination of claim 1 wherein the screw includes a conical body portion for line contact with the wings of said member.

3. The combination of claim 1 wherein said member is a sheet metal part.

4. The combination of claim 1 wherein said member is a resilient sheet metal part including U-shaped end portions which clip onto the adjacent handwheel ribs.

5. The combination of claim 4 wherein said member includes a bridge portion between the wings.

* * * * *